United States Patent
Takahashi et al.

(10) Patent No.: US 11,692,073 B2
(45) Date of Patent: Jul. 4, 2023

(54) RESIN FOAM, RESIN FOAM SHEET, ADHESIVE TAPE, VEHICLE MEMBER, AND BUILDING MEMBER

(71) Applicant: SEKISUI CHEMICAL CO., LTD., Osaka (JP)

(72) Inventors: Katsunori Takahashi, Shiga (JP); Kazuhiko Nakayama, Shiga (JP); Yoshikazu Masuyama, Shiga (JP); Juichi Fukatani, Osaka (JP); Tomohiro Hida, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 609 days.

(21) Appl. No.: 16/627,856

(22) PCT Filed: Jul. 5, 2018

(86) PCT No.: PCT/JP2018/025476
§ 371 (c)(1),
(2) Date: Dec. 31, 2019

(87) PCT Pub. No.: WO2019/009352
PCT Pub. Date: Jan. 10, 2019

(65) Prior Publication Data
US 2020/0157303 A1 May 21, 2020

(30) Foreign Application Priority Data

Jul. 7, 2017 (JP) .............................. JP2017-134166
Nov. 10, 2017 (JP) .............................. JP2017-217411

(51) Int. Cl.
| C08J 9/00 | (2006.01) |
| C09J 7/24 | (2018.01) |
| C08J 5/18 | (2006.01) |
| C08K 5/00 | (2006.01) |
| C08K 5/12 | (2006.01) |

(52) U.S. Cl.
CPC ............... C08J 9/0023 (2013.01); C08J 5/18 (2013.01); C08K 5/0025 (2013.01); C08K 5/12 (2013.01); C09J 7/245 (2018.01); C08J 2205/06 (2013.01); C08J 2331/04 (2013.01); C09J 2203/00 (2013.01); C09J 2431/00 (2013.01)

(58) Field of Classification Search
CPC ........ C08J 9/0023; C08J 5/18; C08J 2205/06; C08J 2331/04; C09J 7/245; C09J 2431/00; C09J 2203/00; C08K 5/0025; C08K 5/12
See application file for complete search history.

(56) References Cited

U.S. PATENT DOCUMENTS

| 2,532,241 | A | * | 11/1950 | Ott ........................... C08J 9/106 |
| | | | | 521/149 |
| 2004/0033354 | A1 | | 2/2004 | Fisher et al. |
| 2008/0064775 | A1 | | 3/2008 | Wheeler et al. |
| 2008/0176969 | A1 | | 7/2008 | Tahri et al. |
| 2013/0273379 | A1 | | 10/2013 | Iwamoto et al. |
| 2013/0324629 | A1 | | 12/2013 | Kanada et al. |
| 2018/0104931 | A1 | | 4/2018 | Asanuma et al. |

FOREIGN PATENT DOCUMENTS

| CN | 103282323 | 9/2013 |
| CN | 103380170 | 10/2013 |
| JP | 58-168549 | 10/1983 |
| JP | 62-59640 | 3/1987 |
| JP | 2-112929 | 4/1990 |
| JP | 5-294681 | 11/1993 |
| JP | 2005-72042 | 3/2005 |
| JP | 2012-102313 | 5/2012 |
| JP | 2015-52726 | 3/2015 |
| JP | 2017-52698 | 3/2017 |
| KR | 10-2010-0007058 | 1/2010 |
| KR | 10-1133056 | 7/2012 |
| WO | 2016/158882 | 10/2016 |

OTHER PUBLICATIONS

"Damping materials and their performance measurement," Ono Sokki.
International Search Report dated Oct. 9, 2018 in International (PCT) Application No. PCT/JP2018/025476.
Extended European Search Report dated Feb. 16, 2021 in corresponding European Patent Application No. 18827429.4.
Communication pursuant to Article 94(3) EPC dated Jan. 11, 2022 in European Patent Application No. 18 827 429.4.
"Damping materials and their performance measurement", [https://www.onosokki.co.jp/HP-WK/c_support/newreport/damp/damp_4.htm], Ono Sokki Co., Ltd., Oct. 17, 2003, with English translation.

* cited by examiner

*Primary Examiner* — Cephia D Toomer
(74) *Attorney, Agent, or Firm* — Wenderoth, Lind & Ponack, L.L.P.

(57) ABSTRACT

The present invention aims to provide a resin foam, a resin foam sheet, an adhesive tape, a member for a vehicle, and a member for a building that are capable of exhibiting very high sound insulation properties. Provided is a resin foam having a multitude of cells, the resin foam containing: a thermoplastic resin; and a plasticizer, the resin foam having a minimum loss factor of a primary anti-resonance frequency in the range of 20° C. to 60° C. of 0.05 or higher and a secondary anti-resonance frequency in the range of 20° C. to 60° C. of 300 to 800 Hz as measured by mechanical impedance measurement (MIM) in conformity with JIS G0602.

25 Claims, No Drawings

RESIN FOAM, RESIN FOAM SHEET, ADHESIVE TAPE, VEHICLE MEMBER, AND BUILDING MEMBER

TECHNICAL FIELD

The present invention relates to a resin foam, a resin foam sheet, an adhesive tape, a member for a vehicle, and a member for a building that are capable of exhibiting very high sound insulation properties.

BACKGROUND ART

Sound insulation materials are placed in sound transmission paths and provide sound insulation or sound proofing by blocking sound transmission. Sound insulation materials are used in various applications such as members for vehicles (e.g., automobiles, aircraft, and ships), members for buildings, electronic components, members for interior materials such as carpet backing materials, and electrical appliances for home and commercial uses.

Common sound insulation materials include foams made of resins or the like, non-woven fabrics, and gels. In particular, resin foams are used in various fields as they exhibit excellent sound insulation properties as well as excellent handleability (for example, Patent Literature 1). In foams, air vibrations caused by incident sound are transmitted to the air in the voids inside the foams. In the voids, viscous friction of the air is generated, which converts part of the sound energy into thermal energy. This is considered to lead to the sound insulation properties.

In recent years, performance requirements for sound insulation materials have become increasingly stringent. Sound insulation materials made of conventional foams may fail to sufficiently reduce sound transmission when placed in a sound transmission path, and the sound from the sound source may still be slightly recognized as noise from the opposite side of the sound insulation material.

CITATION LIST

Patent Literature

Patent Literature 1: JP 2015-52726 A

SUMMARY OF INVENTION

Technical Problem

In view of the situation in the art, the present invention aims to provide a resin foam, a resin foam sheet, an adhesive tape, a member for a vehicle, and a member for a building that are capable of exhibiting very high sound insulation properties.

Solution to Problem

A first aspect of the present invention is a resin foam having a multitude of cells, the resin foam containing: a thermoplastic resin; and a plasticizer, the resin foam having a minimum loss factor of a primary anti-resonance frequency in the range of 20° C. to 60° C. of 0.05 or higher and a secondary anti-resonance frequency in the range of 20° C. to 60° C. of 300 to 800 Hz as measured by mechanical impedance measurement (MIM) in conformity with JIS 60602.

A second aspect of the present invention is a resin foam having a multitude of cells, the resin foam containing: a thermoplastic resin; and a plasticizer, the resin foam having a minimum loss factor of a primary anti-resonance frequency in the range of 20° C. to 60° C. of 0.005 or higher and a secondary anti-resonance frequency in the range of 20° C. to 60° C. of 300 to 800 Hz as measured by mechanical impedance measurement (MIM) in conformity with JIS K7391.

A third aspect of the present invention is a resin foam having a multitude of cells, the resin foam containing: a thermoplastic resin; and a plasticizer, the resin foam having a maximum loss factor of a primary anti-resonance frequency in the range of 0° C. to 50° C. of 0.20 or higher and a secondary anti-resonance frequency in the range of 0° C. to 30° C. of 800 Hz or lower as measured by mechanical impedance measurement (MIM) in conformity with ISO 16940.

The present invention is described in detail below.

According to the first aspect of the present invention, the second aspect of the present invention, and the third aspect of the present invention (hereinafter also referred to as simply "the present invention" in the description of the matters common to the first aspect of the present invention, the second aspect of the present invention, and the third aspect of the present invention), the resin foam contains a thermoplastic resin and a plasticizer.

Examples of the thermoplastic resin include polyvinylidene fluoride, polytetrafluoroethylene, vinylidene fluoride-propylene hexafluoride copolymers, polytrifluoroethylene, acrylonitrile-butadiene-styrene copolymers, polyesters, polyethers, polyamides, polycarbonates, polyacrylates, polymethacrylates, polyvinyl chloride, polyethylene, polypropylene, polystyrene, polyvinyl acetals, and ethylene-vinyl acetate copolymers. Preferred among them are polyvinyl acetals and ethylene-vinyl acetate copolymers, with polyvinyl acetals being more preferred.

Polyvinyl acetals are widely used as raw materials of interlayer films for a laminated glass. When an interlayer film for a laminated glass is bonded to glass in production of a laminated glass, the excess ends of the interlayer film for a laminated glass are cut off. A large amount of interlayer films for a laminated glass is thus discarded. In the present invention, it is very useful from the standpoint of recycling and the like to use the waste interlayer film for a laminated glass generated in a large amount as a raw material.

Any polyvinyl acetal obtained by acetalizing polyvinyl alcohol with an aldehyde may be used. Polyvinyl butyral is suitable. As needed, two or more polyvinyl acetals may be used in combination.

The lower limit of the degree of acetalization of the polyvinyl acetal is preferably 40 mol % and the upper limit thereof is preferably 85 mol %. The lower limit is more preferably 60 mol % and the upper limit thereof is more preferably 75 mol %.

The lower limit of the hydroxy group content of the polyvinyl acetal is preferably 15 mol % and the upper limit thereof is preferably 40 mol %. With the hydroxy group content within this range, the polyvinyl acetal has high compatibility with the plasticizer.

The degree of acetalization and the hydroxy group content can be measured in conformity with "Testing Methods for Polyvinyl Butyral", JIS K 6728, for example.

The polyvinyl acetal can be prepared by acetalizing polyvinyl alcohol with an aldehyde.

The polyvinyl alcohol is commonly prepared by saponifying polyvinyl acetate. Polyvinyl alcohol with a degree of saponification of 70 to 99.8 mol % is normally used. The degree of saponification of the polyvinyl alcohol is preferably 80 to 99.8 mol %.

The lower limit of the degree of polymerization of the polyvinyl alcohol is preferably 500 and the upper limit thereof is preferably 4,000. When the degree of polymerization of the polyvinyl alcohol is 500 or higher, the resulting resin foam has excellent handleability. When the degree of polymerization of the polyvinyl alcohol is 4,000 or lower, formation of the resin foam is facilitated. The lower limit of the degree of polymerization of the polyvinyl alcohol is more preferably 1,000 and the upper limit thereof is more preferably 3,600.

Any aldehyde may be used. Commonly, a C1-C10 aldehyde is suitably used. Any C1-C10 aldehyde may be used. Examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. These aldehydes may be used alone or in combination of two or more thereof. Preferred among them are C2-C10 aldehydes from the standpoint of making it easy to design the resulting foam resin to have high loss factor. More preferred are n-butyraldehyde, n-hexylaldehyde, and n-valeraldehyde, with n-butyraldehyde being particularly preferred.

Any plasticizer may be used. Examples thereof include organic ester plasticizers such as monobasic organic acid esters and polybasic organic acid esters and phosphoric acid plasticizers such as organophosphate plasticizers and organophosphite plasticizers. The plasticizer is preferably a liquid plasticizer.

Any monobasic organic acid ester may be used, and examples thereof include glycol esters obtained by a reaction between a glycol and a monobasic organic acid.

Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproate, triethylene glycol di-2-ethylbutyrate, triethylene glycol di-n-octylate, and triethylene glycol di-2-ethylhexylate.

Any polybasic organic acid ester may be used, and examples thereof include ester compounds of a polybasic organic acid (e.g., adipic acid, sebacic acid, and azelaic acid) and a C4-C8 linear or branched alcohol. In particular, preferred are dibutyl sebacate, dioctyl azelate, and dibutyl carbitol adipate.

Any organic ester plasticizer may be used, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, diisononyl adipate, heptylnonyl adipate, dibutyl sebacate, oil-modified sebacic alkyds, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

Any organophosphate plasticizer may be used, and examples thereof include tributoxyethyl phosphate, isodecylphenyl phosphate, and triisopropyl phosphate.

For less hydrolysis, the plasticizer contains preferably triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate (3GO).

The amount of the plasticizer in the resin foam of the present invention is not limited. The lower limit thereof relative to 100 parts by weight of the thermoplastic resin is preferably 5 parts by weight and the upper limit thereof is preferably 60 parts by weight. The plasticizer in an amount within this range allows the resin foam to exhibit particularly high sound insulation properties, and does not bleed out from the resin foam. The lower limit of the amount of the plasticizer is more preferably 20 parts by weight and the upper limit thereof is more preferably 55 parts by weight.

Many interlayer films for a laminated glass contain about 20 to 55 parts by weight of a plasticizer relative to 100 parts by weight of a polyvinyl acetal. The waste interlayer film for a laminated glass thus can be used as it is as a raw material of the resin foam of the present invention.

The resin foam of the present invention preferably further contains an adhesive. With the adhesive, the resin foam of the present invention can exhibit adhesiveness, which improves handleability.

Any adhesive may be used. Examples thereof include known adhesives such as acrylic adhesives, urethane adhesives, and rubber adhesives.

The resin foam of the present invention may contain, in addition to the thermoplastic resin and the plasticizer, additives such as an adhesion modifier, a heat absorbing agent, a UV shielding agent, an antioxidant, a light stabilizer, and an antistatic agent. The resin foam may also contain a pigment such as carbon black or a dye to adjust the appearance of the resin foam.

The resin foam of the first aspect of the present invention has a minimum loss factor of a primary anti-resonance frequency in the range of 20° C. to 60° C. of 0.05 or higher and a secondary anti-resonance frequency in the range of 20° C. to 60° C. of 300 to 800 Hz as measured by mechanical impedance measurement (MIM) in conformity with JIS G0602.

JIS G0602 is a standard in which the loss factor of the primary anti-resonance frequency and the secondary anti-resonance frequency are determined by conducting mechanical impedance measurement (MIM) with the subject interposed between two steel plates. Since the measurement is conducted with the subject interposed between steel plates, the standard is considered to correspond to the cases where the resin foam is used in applications such as damping materials or sound insulation materials to be placed in, for example, a gap between the interior and the exterior of an automobile or the like, a gap between a floor substrate and a floor surface material of a house, a gap between an exterior wall and the interior of a house, or a gap between panels constituting a soundproof material.

In the resin foam of the first aspect of the present invention, the minimum loss factor of the primary anti-resonance frequency (hereinafter, the loss factor of the primary anti-resonance frequency may also be referred to as simply a "loss factor") is 0.05 or higher. The resin foam thus can exhibit high vibration absorption performance to cause loss of sound energy, and thereby can exhibit high sound insulation properties. The loss factor of the primary anti-resonance frequency is preferably 0.06 or higher, more preferably 0.11 or higher.

In the resin foam of the first aspect of the present invention, the secondary anti-resonance frequency is 300 to 800 Hz. Thus, even when resonance occurs between the resin foam and a material used in combination, the resonance has a low frequency and thus is less likely to be perceived as noise by the human ear. The lower limit of the secondary anti-resonance frequency is preferably 320 Hz and the upper limit thereof is preferably 720 Hz. The lower limit is more preferably 330 Hz and the upper limit is more preferably 630 Hz.

The phrase "the secondary anti-resonance frequency is 300 to 800 Hz" means that the minimum secondary anti-resonance frequency is 300 Hz or higher and the maximum secondary anti-resonance frequency is 800 Hz or lower.

In the first aspect of the present invention, the loss factor of the primary anti-resonance frequency and the secondary anti-resonance frequency in the range of 20° C. to 60° C. are measured. This is because in resonance phenomenon, the primary resonance has the largest amplitude and thus is of greatest concern as a vibration component, and also because, since the vibrations in the medium frequency range of 300 to 800 Hz are often of practical concern regardless of application (e.g., automobiles, housing), it is preferable that the resin foam has a resonance point in this range.

The resin foam of the second aspect of the present invention has a minimum loss factor of a primary anti-resonance frequency in the range of 20° C. to 60° C. of 0.005 or higher and a secondary anti-resonance frequency in the range of 20° C. to 60° C. of 300 to 800 Hz as measured by mechanical impedance measurement (MIM) in conformity with JIS K7391.

JIS K7391 is a standard in which the loss factor of the primary anti-resonance frequency and the secondary anti-resonance frequency are determined by conducting mechanical impedance measurement (MIM) with one surface of the subject attached to one steel plate and the other surface open. Since the measurement is conducted with one surface of the subject attached to one steel plate and the other surface open, the standard is considered to correspond to the cases where the resin foam is used in applications such as sound insulation materials or damping materials providing sound insulation or soundproof properties to be attached to, for example, the interior or the exterior of an automobile or the like, an exterior wall or an interior wall of a house, or a wall intended to provide sound insulation or soundproof properties.

In the resin foam of the second aspect of the present invention, the minimum loss factor of the primary anti-resonance frequency is 0.005 or higher. The resin foam thus can exhibit high vibration absorption performance to cause loss of sound energy, and thereby can exhibit high sound insulation properties. The loss factor of the primary anti-resonance frequency is preferably 0.006 or higher, more preferably 0.007 or higher.

In the resin foam of the second aspect of the present invention, the secondary anti-resonance frequency is 300 to 800 Hz. Thus, even when resonance occurs between the resin foam and a material used in combination, the resonance has a low frequency and thus is less likely to be perceived as noise by the human ear. The lower limit of the secondary anti-resonance frequency is preferably 440 Hz and the upper limit thereof is preferably 740 Hz. The lower limit is more preferably 470 Hz and the upper limit is more preferably 720 Hz.

The phrase "the secondary anti-resonance frequency is 300 to 800 Hz" means that the minimum secondary anti-resonance frequency is 300 Hz or higher and the maximum secondary anti-resonance frequency is 800 Hz or lower.

In the second aspect of the present invention, the loss factor of the primary anti-resonance frequency and the secondary anti-resonance frequency in the range of 20° C. to 60° C. are measured. This is because in resonance phenomenon, the primary resonance has the largest amplitude and thus is of greatest concern as a vibration component, and also because, since the vibrations in the medium frequency range of 300 to 800 Hz are often of practical concern regardless of application (e.g., automobiles, housing), it is preferable that the resin foam has a resonance point in this range.

The resin foam of the third aspect of the present invention has a maximum loss factor of a primary anti-resonance frequency in the range of 0° C. to 50° C. of 0.20 or higher and a secondary anti-resonance frequency in the range of 0° C. to 30° C. of 800 Hz or lower as measured by mechanical impedance measurement (MIM) in conformity with ISO 16940.

ISO 16940 is a standard in which the loss factor of the primary anti-resonance frequency and the secondary anti-resonance frequency are determined by conducting mechanical impedance measurement (MIM) with the subject interposed between two glass plates. Since the measurement is conducted with the subject interposed between glass plates, the standard is considered to correspond to the cases where the resin foam is used in applications such as: damping materials for vibration reduction to be placed in a gap between a mirror glass of a mirror attachable to a wall surface and a wall surface; or shock absorption materials or damping materials to be placed in a gap between a front surface plate and a housing of a TV set, a smartphone, a tablet personal computer, a personal computer, or the like.

In the resin foam of the third aspect of the present invention, the maximum loss factor of the primary anti-resonance frequency is 0.20 or higher. The resin foam thus can exhibit high vibration absorption performance to cause loss of sound energy, and thereby can exhibit high sound insulation properties. The loss factor of the primary anti-resonance frequency is preferably 0.24 or higher, more preferably 0.33 or higher.

In the resin foam of the third aspect of the present invention, the secondary anti-resonance frequency is 800 Hz or lower. Thus, even when resonance occurs between the resin foam and a material used in combination, the resonance has a low frequency and thus is less likely to be perceived as noise by the human ear. The secondary anti-resonance frequency is preferably 780 Hz or lower. The lower limit of the secondary anti-resonance frequency is not limited, but is preferably 300 Hz or higher.

The phrase "the secondary anti-resonance frequency is 800 Hz or lower" means that the maximum secondary anti-resonance frequency is 800 Hz or lower.

In the third aspect of the present invention, the loss factor of the primary anti-resonance frequency in the range of 0° C. to 50° C. and the secondary anti-resonance frequency in the range of 0° C. to 30° C. are measured. This is because in resonance phenomenon, the primary resonance has the largest amplitude and thus is of greatest concern as a vibration component, and also because, since the vibrations in the medium frequency range of 300 to 800 Hz are often of practical concern regardless of application (e.g., automobiles, housing), it is preferable that the resin foam has a resonance point in this range.

The above loss factor and secondary anti-resonance frequency can be achieved by adjusting the foam state of the resin foam. Specifically, for example, the open cell ratio of the resin foam is preferably 20% or higher. An open cell ratio of 20% or higher enables adjustment of the loss factor of the primary anti-resonance frequency and the second anti-resonance frequency of the resulting resin foam within predetermined ranges, leading to very high sound insulation properties. The open cell ratio is more preferably 30% or higher, still more preferably 40% or higher, particularly preferably 50% or higher. The upper limit of the open cell ratio is not limited, but is practically about 98%.

The open cell as used herein refers to cells connected to each other in the resin foam.

The open cell ratio is defined as the volumetric ratio of cells connected to the outside of the resin foam relative to the apparent volume of the resin foam determined by size measurement, and can be determined by pycnometry described in JIS K 7138 or the like.

The lower limit of the average cell size of the resin foam of the present invention is preferably 100 μm and the upper limit thereof is preferably 1,000 μm. With the average cell size within this range, the resin foam can exhibit higher sound insulation properties. The lower limit of the average cell size is more preferably 120 μm and the upper limit thereof is more preferably 500 μm. The lower limit is still more preferably 200 μm.

The average cell size can be determined by observing cell walls and void spaces in a cross-sectional photograph of cells and measuring the sizes of the void spaces.

The resin foam of the present invention preferably has an average aspect ratio of cells of 2 or less. When the average aspect ratio of cells is 2 or less, the resin foam can exhibit higher sound insulation properties. The average aspect ratio of cells is more preferably 1.5 or less.

The average aspect ratio of cells can be determined by measuring the major axis and minor axis of each void space in a cross-sectional photograph of cells and calculating the ratio of the axes.

The resin foam of the present invention preferably has an apparent density of 300 kg/m$^3$ or less. The resin foam having an apparent density of 300 kg/m$^3$ or less can exhibit better shock absorption, better damping, and lower fluidity. The apparent density is more preferably 200 kg/m$^3$ or less. The lower limit of the apparent density is not limited, but is practically about 50 kg/m$^3$.

The upper limit of the thickness of the resin foam of the present invention is preferably 10 mm or less. With the upper limit of the thickness of the resin foam within the preferable range, the resin foam is less likely to undergo shear fracture. The lower limit of the thickness of the resin foam of the present invention is preferably 50 μm or more. With the lower limit of the thickness of the resin foam within the preferable range, the resin foam can have further improved sound insulation properties.

The resin foam of the present invention may be produced by any method. It is preferably produced by a method of blending the thermoplastic resin, the plasticizer, and additives according to needs with a heat-decomposable foaming agent to prepare a resin composition and then heating the resin composition to a foaming temperature to decompose the heat-decomposable foaming agent.

For adjusting the open cell ratio to 20% or higher and adjusting the loss factor of the primary anti-resonance frequency and the secondary anti-resonance frequency within predetermined ranges to achieve very high sound insulation properties, it is significantly important to appropriately set the type and amount of the heat-decomposable foaming agent and the foaming temperature in production of the resin foam, as well as to appropriately select the thermoplastic resin and the plasticizer. In particular, setting of the foaming temperature is essential to achieve the high open cell ratio.

The foaming temperature is preferably 180° C. or higher. When the foaming temperature is 180° C. or higher, the resin composition upon foaming is sufficiently softened to facilitate communication between cells, presumably facilitating generation of open cells.

The heat-decomposable foaming agent may be any conventionally known foaming agent having a decomposition temperature of about 120° C. to 240° C. For a higher open cell ratio, the heat-decomposable foaming agent preferably has a decomposition temperature higher by 20° C. or more, more preferably by 50° C. or more, than the molding temperature of the resin composition as a raw material before foaming.

Specific examples of the heat-decomposable foaming agent include azodicarbonamide, N,N'-dinitrosopentamethylenetetramine, 4,4'-oxybis(benzenesulfonylhydrazide), urea, sodium hydrogen carbonate, and mixtures of these.

Examples of commercial products of the heat-decomposable foaming agent include CELLMIC series (available from Sankyo Kasei Co., Ltd.) and VINYFOR series, CELLULAR series, and NEOCELLBORN series (available from Eiwa Chemical Inc. Co., Ltd.).

The amount of the heat-decomposable foaming agent in the resin composition is not limited. The lower limit of the amount of the heat-decomposable foaming agent is preferably 4 parts by weight and the upper limit thereof is preferably 20 parts by weight, relative to 100 parts by weight of the thermoplastic resin. With the amount of the heat-decomposable foaming agent within this range, the foam having an open cell ratio of 10% or higher can be produced. The lower limit of the amount of the heat-decomposable foaming agent is more preferably 5 parts by weight and the upper limit thereof is more preferably 15 parts by weight.

The resin foam of the present invention has the structure described above, and thus can exhibit very high sound insulation properties that have been unachievable by sound insulation materials made of conventional resin foams. The resin foam of the present invention is thus highly suitable as a sound insulating material or a soundproof material.

Specifically, for example, the resin foam of the present invention can be used in various applications such as members for vehicles (e.g., automobiles, aircraft, and ships), members for buildings, electronic components, members for interior materials such as carpet backing materials, and electrical appliances for home and commercial uses. In particular, a resin foam sheet obtained by molding the resin foam of the present invention into a sheet form can have excellent handleability and can be suitably used in many applications.

The present invention also encompasses a resin foam sheet containing the resin foam of the present invention.

An adhesive tape including an adhesive layer provided on at least one surface of the resin foam sheet of the present invention has very good handleability.

The present invention also encompasses an adhesive tape including the resin foam sheet of the present invention and an adhesive layer provided on at least one surface of the resin foam sheet.

The adhesive layer may contain any adhesive. Examples thereof include known adhesives such as acrylic adhesives, urethane adhesives, and rubber adhesives.

Here, since the resin foam sheet of the present invention contains a plasticizer, the plasticizer may migrate to the adhesive layer and decrease the adhesive force. The adhesive layer thus preferably has high plasticizer resistance.

Examples of the adhesive layer having high plasticizer resistance include those formed from an adhesive composition containing an acrylic polymer (X), a tackifier resin (Y) having a softening point of 140° C. to 160° C., and a cross-linking agent (Z). Use of such an adhesive composition reduces the decrease in adhesive force with time due to migration of the plasticizer.

The components constituting the adhesive composition are described in detail below.

The acrylic polymer (X) is a polymer obtained by polymerizing a monomer mixture containing: 100 parts by weight of an alkyl (meth)acrylate monomer (A) containing 60% by weight or more an alkyl (meth)acrylate monomer (a) that has an alkyl group with a carbon number of 4 or less; and 5 to 18 parts by weight of a carboxy group-containing monomer (B).

The (meth)acrylic acid as used herein means acrylic acid or methacrylic acid. The (meth)acrylate as used herein means acrylate or methacrylate.

The alkyl (meth)acrylate monomer (A) preferably contains 60% by weight or more an alkyl (meth)acrylate monomer (a) that has an alkyl group with a carbon number of 4 or less. When the amount of the alkyl (meth)acrylate monomer (a) that has an alkyl group with a carbon number of 4 or less is 60% by weight or more, the resulting adhesive layer has high plasticizer resistance. The amount of the alkyl (meth)acrylate monomer (a) is more preferably 80% by weight or more, still more preferably 90% by weight or more, particularly preferably 100% by weight from the standpoint of reducing a decrease in adhesive force to soft polyvinyl chloride.

Specific examples of the alkyl (meth)acrylate monomer (a) include methyl (meth)acrylate, ethyl (meth)acrylate, propyl (meth)acrylate, isopropyl (meth)acrylate, n-butyl (meth)acrylate, isobutyl (meth)acrylate, and t-butyl (meth)acrylate. These alkyl (meth)acrylate monomers (a) may be used alone or in combination of two or more thereof. In particular, the alkyl (meth)acrylate monomer (a) preferably contains n-butyl (meth)acrylate, more preferably contains only n-butyl (meth)acrylate alone.

The alkyl (meth)acrylate monomer (A) may contain an alkyl (meth)acrylate monomer (b) that has an alkyl group with a carbon number of 5 or more.

Specific examples of the alkyl (meth)acrylate monomer (b) include 2-ethylhexyl (meth)acrylate, isooctyl (meth)acrylate, isononyl (meth)acrylate, and lauryl (meth) acrylate.

When the alkyl (meth)acrylate monomer (A) contains the alkyl (meth)acrylate monomer (b), the amount of thereof in the alkyl (meth)acrylate monomer (A) is preferably 20% by weight or less, more preferably 10% by weight or less.

The carboxy group-containing monomer (B) is a polymerizable monomer having a carboxy group in the molecule, preferably a vinyl monomer containing a carboxy group.

Specific examples of the carboxy group-containing monomer (B) include (meth)acrylic acid, itaconic acid, maleic acid, fumaric acid, and crotonic acid. These carboxy group-containing monomers (B) may be used alone or in combination of two or more thereof. Among them, (meth)acrylic acid is preferred, and acrylic acid is more preferred.

The monomer mixture as a raw material of the acrylic polymer (X) may further contain a monomer other than the alkyl (meth)acrylate monomer (A) and the carboxy group-containing monomer (B).

Examples of such other monomers include monomers containing a polar group other than a carboxy group and styrene monomers such as styrene, α-methylstyrene, o-methylstyrene, and p-methylstyrene.

In the monomer mixture as a raw material of the acrylic polymer (X), the lower limit of the amount of the carboxy group-containing monomer (B) relative to 100 parts by weight of the alkyl (meth)acrylate monomer (A) is preferably 5 parts by weight and the upper limit thereof is preferably 18 parts by weight. Use of 5 parts by weight or more of the carboxy group-containing monomer (B) allows the resulting adhesive layer to have high plasticizer resistance. The lower limit of the amount of the carboxy group-containing monomer (B) is more preferably 6 parts by weight and the upper limit thereof is more preferably 17 parts by weight. The lower limit is still more preferably 10 parts by weight and the upper limit is still more preferably 15 parts by weight.

The lower limit of the weight average molecular weight of the acrylic polymer (X) is preferably 550,000 and the upper limit thereof is preferably 1,000,000. When the weight average molecular weight is 550,000 or more, the resulting adhesive layer has high plasticizer resistance. When the weight average molecular weight is 1,000,000 or less, the adhesive layer is less likely to be too hard and thus can exhibit adhesive force to an adherend with a complex shape. The lower limit of the weight average molecular weight is more preferably 600,000 and the upper limit thereof is more preferably 800,000. The lower limit is still more preferably 650,000 and the upper limit is still more preferably 750,000.

The acrylic polymer (X) is obtained by polymerizing the monomer mixture.

Any polymerization method may be used. An exemplary method involves radical polymerization of the monomer mixture in the presence of a polymerization initiator. Specifically, a conventionally known polymerization method may be used such as solution polymerization, emulsion polymerization, suspension polymerization, or bulk polymerization.

Any polymerization initiator may be used. Examples thereof include organic peroxide polymerization initiators and azo polymerization initiators.

Examples of the organic peroxide polymerization initiator include cumene hydroperoxide, benzoyl peroxide, lauroyl peroxide, octanoyl peroxide, stearoyl peroxide, o-chlorobenzoyl peroxide, acetyl peroxide, t-butyl hydroperoxide, t-butyl peroxyacetate, t-butyl peroxyisobutyrate, 3,5,5-trimethylhexanoyl peroxide, t-butyl peroxy-2-ethylhexanoate, and di-t-butyl peroxide.

Examples of the azo polymerization initiator include 2,2'-azobisisobutyronitrile, 2,2'-azobis(2,4-dimethylvaleronitrile), 4,4'-azobis(4-cyanopentanoic acid), and 2,2'-azobis(2-methylbutyronitrile).

These polymerization initiators may be used alone or in combination of two or more thereof. Preferred among them are lauroyl peroxide, octanoyl peroxide, stearoyl peroxide, and 3,5,5-trimethylhexanoyl peroxide from the standpoint of reducing odor of the resulting acrylic polymer (X).

The amount of the polymerization initiator is not limited. The polymerization initiator is preferably used in an amount of about 0.01 to 10 parts by weight, more preferably about 0.05 to 2 parts by weight relative to 100 parts by weight of the monomer mixture.

The lower limit of the softening point of the tackifier resin (Y) is preferably 140° C. and the upper limit thereof is preferably 160° C. With the softening point within the range, the decrease in adhesive force of the adhesive layer with time can be reduced. From the standpoint of further reducing the decrease in adhesive force with time, the upper limit of the softening point is more preferably 150° C.

The softening point of the tackifier resin (Y) can be measured in conformity with JIS K2207.

Examples of the tackifier resin (Y) include petroleum resin-type tackifier resins, hydrogenated petroleum resin-type tackifier resins, rosin-type resins such as rosin diol-type tackifier resins and rosin ester-type tackifier resins, terpene resins, phenolic resins, xylene resins, coumarone resins, ketone resins, and modified resins thereof. These tackifier resins may be used alone or in combination of two or more thereof. Preferred among them are rosin-type tackifier resins from the standpoint of reducing the decrease in adhesive force with time. Rosin ester-type tackifier resins are more preferred.

Examples of the rosin ester-type tackifier resin include disproportionated rosin ester-type, polymerized rosin ester-type, hydrogenated rosin ester-type, and rosin phenol-type tackifier resins.

In the tackifier resin (Y), the amount of a component having a molecular weight of 600 or less is preferably 13% by weight or less. With such a tackifier resin, the amount of volatile components generated from the tackifier resin can be kept low while the adhesiveness is maintained. In addition, since the amount of the low-molecular-weight component is small, the adhesive layer can have relatively high viscosity. The adhesive layer is thus more likely to inhibit the migration of the plasticizer to the adhesive layer and is less likely to suffer the decrease in adhesive force with time.

The component having a molecular weight of 600 or less can be removed from the tackifier resin by, for example, a method involving heating and melting the tackifier resin at a temperature equal to or higher than the softening point, or a method involving blowing water vapor into the tackifier resin.

The molecular weight can be calculated as a value in terms of polystyrene and the amount can be calculated based on the area ratio.

In the adhesive composition, the lower limit of the amount of the tackifier resin (Y) relative to 100 parts by weight of the acrylic polymer (X) is preferably 3 parts by weight and the upper limit thereof is preferably 9 parts by weight. When the amount of the tackifier resin is 3 parts by weight or more, adhesive force to a hard-to-bond material is improved. When the amount of the tackifier resin is 9 parts by weight or less, the migration of the plasticizer to the adhesive layer can be easily suppressed, making it possible to prevent the decrease in adhesive force with time. From the standpoint of increasing adhesive force to a hard-to-bond material and maintaining the adhesive force, the lower limit of the amount of the tackifier resin (Y) is more preferably 4 parts by weight and the upper limit thereof is more preferably 8 parts by weight. The upper limit is still more preferably 7 parts by weight.

The cross-linking agent (Z) functions to enhance the cohesive force of the resulting adhesive layer and improve the physical properties of the adhesive tape.

Any cross-linking agent (Z) may be used. Examples thereof include isocyanate cross-linking agents, epoxy cross-linking agents, aziridine cross-linking agents, and metal chelate cross-linking agents. Preferred among them are isocyanate cross-linking agents and metal chelate cross-linking agents.

Specific examples of the isocyanate cross-linking agent include tolylene diisocyanate, naphtylene-1,5-diisocyanate, and diphenylmethane diisocyanate. Commercially available examples include Coronate L available from Nippon Polyurethane Industry Co., Ltd.

Specific examples of the metal chelate cross-linking agent include chelate compounds in which the metal atom is an aluminum atom, a zirconium atom, a titanium atom, a zinc atom, an iron atom, a tin atom, or the like. Preferred among them are aluminum chelates whose central metal is aluminum. Commercially available aluminum chelates include Aluminum Chelate A and Aluminum Chelate M available from Kawaken Fine Chemicals Co., Ltd.

The amount of the cross-linking agent (Z) in the adhesive composition is not limited. The lower limit thereof relative to 100 parts by weight of the acrylic polymer (X) is preferably 0.005 parts by weight and the upper limit thereof is preferably 5 parts by weight. The lower limit is more preferably 0.01 parts by weight and the upper limit is more preferably 1 part by weight. The lower limit is still more preferably 0.02 parts by weight and the upper limit is still more preferably 0.1 parts by weight.

The adhesive composition may contain, in addition to the acrylic polymer (X), the tackifier resin (Y), and the cross-linking agent (Z), a solvent such as ethyl acetate, dimethyl sulfoxide, ethanol, acetone, or diethyl ether. Preferred among them is ethyl acetate from the standpoint of keeping the amount of volatile components low.

The adhesive composition may further contain additives such as a filler, a pigment, a dye, or an antioxidant as needed.

The lower limit of the thickness of the adhesive layer is preferably 5 μm and the upper limit thereof is preferably 200 μm. The adhesive layer having a thickness within this range can exhibit sufficient adhesiveness. The lower limit of the thickness of the adhesive layer is more preferably 7 μm and the upper limit thereof is more preferably 150 μm. The lower limit is still more preferably 10 μm and the upper limit is still more preferably 100 μm.

The adhesive layer may be formed by any method on at least one surface of the resin foam sheet of the present invention to produce the adhesive tape of the present invention. Examples of the method include a method involving applying the adhesive to at least one surface of the resin foam sheet with an applicator such as a coater, a method involving applying the adhesive to at least one surface of the resin foam sheet by spraying with a spray, and a method involving applying the adhesive to at least one surface of the resin foam sheet with a brush. Alternatively, the adhesive layer may be formed by a method involving attaching a double-sided adhesive tape to at least one surface of the resin foam sheet.

The resin foam, resin foam sheet, and adhesive tape of the present invention can exhibit very high sound insulation properties and thus can exhibit excellent performance as a sound insulating material or a soundproof material. Therefore, the resin foam, resin foam sheet, and adhesive tape can be used in various applications such as members for vehicles (e.g., automobiles, aircraft, and ships), members for buildings, electronic components, members for interior materials such as carpet backing materials, and electrical appliances for home and commercial uses.

Examples of the members for interior materials include those used for reducing the vibration, shock, or noise, such as carpet backing materials, curtain materials, and wallpaper.

Examples of the electric members include electronic components in mobile phones, tablet PCs, and PCs, and those used for reducing the vibration, shock, or noise in home appliances such as audio instruments, headphones, TV sets, refrigerators, washing machines, and cleaners, or commercial-use electrical appliances.

Examples of the members for other applications include those used for relaxation of shock upon collision in floors, mats, or walls in indoor/outdoor athletic facilities.

The resin foam, resin foam sheet, and adhesive tape of the present invention are particularly suitable as members for vehicles and members for buildings.

The present invention also encompasses a member for a vehicle including the resin foam, resin foam sheet, or adhesive tape of the present invention.

The present invention also encompasses a member for a building including the resin foam, resin foam sheet, or adhesive tape of the present invention.

Examples of the member for a vehicle include those used for reducing the vibration, shock, or noise, such as ceiling materials, interior materials, and interior lining materials of vehicles including automobiles, aircraft, and ships.

Specific examples of the member for a vehicle include: deadening materials to be directly attached to a steel plate member (e.g., the ceiling, door panel, or floorboard) of a vehicle such as an automobile; and damping materials and cushioning materials to be interposed between a steel plate member constituting the exterior or the framework and an interior resin member.

Examples of the member for a building include those used for reducing the vibration, shock, or noise, such as floor substrates, materials for soundproof walls, ceiling materials, and lining materials for resin or metal roof tiles.

Specific examples of the member for a building include: deadening materials to be directly attached to a metal roof tile made of Galvalume® to reduce rainfall noise; and sound insulation mats to be interposed between a flooring material and a lining material for house flooring.

Advantageous Effects of Invention

The present invention can provide a resin foam, a resin foam sheet, an adhesive tape, a member for a vehicle, and a member for a building that are capable of exhibiting very high sound insulation properties.

DESCRIPTION OF EMBODIMENTS

Embodiments of the present invention are more specifically described in the following with reference to, but not limited to, examples.

Example 1

(1) Production of Resin Foam

To 100 parts by weight of polyvinyl butyral 1 (PVB1) were added 40 parts by weight of triethylene glycol di-2-ethylhexanoate (3GO) as plasticizer and 9 parts by weight of CELLMIC CE (available from Sankyo Kasei Co., Ltd., decomposition temperature: 208° C.) as a heat-decomposable foaming agent to give a resin composition. The obtained resin composition was sufficiently kneaded at 110° C. with a mixing roll and then extruded from an extruder into a sheet. PVB1 had a hydroxy group content of 34 mol %, a degree of acetylation of 1.0 mol %, a degree of butyralization of 65 mol %, and an average degree of polymerization of 1,650.

The obtained sheet was placed in an oven to decompose the heat-decomposable foaming agent at a foaming temperature of 220° C., whereby a resin foam in a sheet form (resin foam sheet) was obtained. The obtained resin foam sheet had a thickness of 4 mm.

(2) Measurement of Open Cell Ratio and Apparent Density

The open cell ratio of the obtained resin foam was measured by pycnometry in conformity with JIS K 7138. The apparent density was obtained by calculation based on the measured weight and the apparent volume obtained from size measurement.

(3) Measurement of Loss Factor of Primary Anti-Resonance Frequency and Secondary Anti-Resonance Frequency (3-1) Measurement in Conformity with JIS G0602

Mechanical impedance measurement (MIM) was conducted in conformity with JIS G0602 to measure the loss factor of the primary anti-resonance frequency in the range of 20° C. to 60° C. and the secondary anti-resonance frequency in the range of 20° C. to 60° C.

Specifically, the loss factor of the primary anti-resonance frequency and the secondary anti-resonance frequency were measured by a central exciting method using a laminate sample. The sample was prepared by fixing the resin foam between two steel plates that were each 12 mm wide, 240 mm long, and 1.6 mm thick with a double-sided adhesive tape (available from Sekisui Chemical Co., Ltd., #5782).

(3-2) Measurement in Conformity with JIS K7391

Mechanical impedance measurement (MIM) was conducted in conformity with JIS K7391 to measure the loss factor of the primary anti-resonance frequency in the range of 20° C. to 60° C. and the secondary anti-resonance frequency in the range of 20° C. to 60° C.

Specifically, the loss factor of the primary anti-resonance frequency and the secondary anti-resonance frequency were measured by a central exciting method using a laminate sample. The sample was prepared by fixing the resin foam to a steel plate that was 12 mm wide, 240 mm long, and 1.6 mm thick with a double-sided adhesive tape (available from Sekisui Chemical Co., Ltd., #5782).

(3-3) Measurement in Conformity with ISO 16940

Mechanical impedance measurement (MIM) was conducted in conformity with ISO 16940 to measure the loss factor of the primary anti-resonance frequency in the range of 0° C. to 50° C. and the secondary anti-resonance frequency in the range of 0° C. to 30° C.

Specifically, the loss factor of the primary anti-resonance frequency and the secondary anti-resonance frequency were measured by a central exciting method using a laminate sample. The sample was prepared by fixing the resin foam between two glass plates that were each 25 mm wide, 305 mm long, and 2 mm thick with a double-sided adhesive tape (available from Sekisui Chemical Co., Ltd., #5782).

Examples 2 to 4 and Comparative Example 4

A resin foam was produced and the loss factor of the primary anti-resonance frequency and the secondary anti-resonance frequency were measured as in Example 1 except that the amounts of the heat-decomposable foaming agent and the plasticizer were as shown in Table 1.

Example 5

A resin foam was produced and the loss factor of the primary anti-resonance frequency and the secondary anti-resonance frequency were measured as in Example 1 except that polyvinyl butyral 2 (PVB2) was used instead of polyvinyl butyral 1, and that the amount of the heat-decomposable foaming agent was as shown in Table 1. PVB2 had a hydroxy group content of 23 mol %, a degree of acetylation of 13 mol %, a degree of butyralization of 64 mol %, and an average degree of polymerization of 2,400.

Comparative Example 1

A commercially available polyethylene foam (available from Sekisui Chemical Co., Ltd., Softlon S, expansion ratio: 30 times) was provided as a comparative example. The loss factor of the primary anti-resonance frequency and the secondary anti-resonance frequency of the polyethylene foam were measured as in Example 1.

Comparative Example 2

A commercially available ethylene-vinyl acetate copolymer (EVA) foam (available from Mitsufuku Industry Co., Ltd., MITSUFUKU FOAM V10) was provided as a comparative example. The loss factor of the primary anti-resonance frequency and the secondary anti-resonance frequency of the EVA foam were measured as in Example 1.

Comparative Example 3

A commercially available urethane gel (available from Exseal Co., Ltd., EXSEAL) was provided as a comparative example. The loss factor of the primary anti-resonance frequency and the secondary anti-resonance frequency of the urethane gel were measured as in Example 1.

Comparative Example 5

A resin foam was produced and the loss factor of the primary anti-resonance frequency and the secondary anti-resonance frequency were measured as in Example 1 except that CELLMIC CAP (available from Sankyo Kasei Co., Ltd., decomposition temperature: 125° C.) was used as a heat-decomposable foaming agent, and that the foaming temperature was 150° C.

(Evaluation)

The resin foams obtained in the examples and comparative examples were evaluated as follows.

Tables 1 and 2 show the results.

(Evaluation 1 of Sound Insulation Properties)

The sound transmission loss was measured by a sound intensity method in conformity with JIS A 1441. The measurement was performed at a measurement temperature of 20° C. for each ⅓ octave band in the frequency range of 100 to 10,000 Hz. The sample was prepared by interposing a resin foam sample (thickness: about 4 mm) between 2-mm-thick glass plates and fixing the resin foam sample with a double-sided adhesive tape (available from Sekisui Chemical Co., Ltd., #5782). The size (the opening) was 500 mm×500 mm. The incident power was calculated from the average sound pressure level of 5 points in the reverberation room. The transmitted power was calculated from the sound intensity at 5×5=25 points in the measurement area (500 mm×500 mm).

The sound insulation properties were evaluated in accordance with the following criteria.

A frequency-transmission loss graph was plotted. The sound insulation properties were evaluated as "0 (Good)" when the difference in transmission loss between the first local maximum on the low frequency side and its adjacent local minimum is 7 dB or less, and evaluated as "x (Poor)" when the difference in transmission loss was more than 7 dB.

(Evaluation 2 of Sound Insulation Properties)

The airborne sound insulation properties were evaluated in conformity with JIS A 1417-1, Rating of sound insulation in buildings and building elements: Airborne sound insulation.

The measurement was performed at a measurement temperature of 25° C. for each 1/1 octave band in the frequency range of 31.5 to 4,000 Hz. The sample was prepared by fixing a resin foam sample (thickness: about 4 mm) to a plaster board with a double-sided adhesive tape (available from Sekisui Chemical Co., Ltd., #5782). The size (the opening) was 990 mm×990 mm. A sound was produced from the reverberation room side at a sound pressure of 100 dB, and the differential pressure was measured on the anechoic room side.

The sound insulation properties were evaluated in accordance with the following criteria.

A 1/1 octave band frequency-sound pressure level graph was plotted. The sound insulation properties were evaluated as "o (Good)" when the average DM value was +1.0 dB or more relative to the value without the resin foam, and evaluated as "x (Poor)" when the average DM value was less than +1.0 dB relative to the value without the resin foam.

(Evaluation 3 of Sound Insulation Properties)

The airborne sound insulation properties were evaluated in conformity with JIS A 1417-1, Rating of sound insulation in buildings and building elements: Airborne sound insulation.

The measurement was performed at a measurement temperature of 25° C. for each 1/1 octave band in the frequency range of 31.5 to 4,000 Hz. The sample was prepared by fixing aluminum (0.3 mm) to the resin foam (thickness: about 4 mm) with a double-sided adhesive tape (available from Sekisui Chemical Co., Ltd., #5782) and fixing the surface without the aluminum laminated thereon to a plaster board with a double-sided adhesive tape (available from Sekisui Chemical Co., Ltd., #5782). The size (the opening) was 990 mm×990 mm. A sound was produced from the reverberation room side at a sound pressure of 100 dB, and the differential pressure was measured on the anechoic room side.

The sound insulation properties were evaluated in accordance with the following criteria.

A 1/1 octave band frequency-sound pressure level graph was plotted. The sound insulation properties were evaluated as "0 (Good)" when the average DM value was +2.0 dB or more relative to the value without the resin foam, and evaluated as "x (Poor)" when the average DM value was less than +2.0 dB relative to the value without the resin foam.

TABLE 1

| | | | | Example 1 | Example 2 | Example 3 | Example 4 | Example 5 |
|---|---|---|---|---|---|---|---|---|
| Resin composition | Thermoplastic resin | Type | — | PVB1 | PVB1 | PVB1 | PVB1 | PVB2 |
| | | Amount | Parts by weight | 100 | 100 | 100 | 100 | 100 |
| | Plasticizer | Type | — | 3GO | 3GO | 3GO | 3GO | 3GO |
| | | Amount | Parts by weight | 40 | 40 | 40 | 20 | 60 |

TABLE 1-continued

|  |  |  |  | Example 1 | Example 2 | Example 3 | Example 4 | Example 5 |
|---|---|---|---|---|---|---|---|---|
|  | Foaming agent | Type | — | CELLMIC CE | CELLMIC CE | CELLMIC CE | CELLMIC CE | CELLMIC CE |
|  |  | Amount | Parts by weight | 9 | 4 | 17 | 9 | 8 |
| Foaming temperature |  |  | °C. | 220 | 220 | 220 | 220 | 220 |
| Foam | Open cell ratio |  | % | 86 | 54 | 85 | 63 | 90 |
|  | Apparent density |  | kg/m³ | 100 | 130 | 70 | 120 | 90 |
|  | JIS G0602 | Loss factor of primary anti-resonance peak (maximum value in the range of 20° C. to 60° C.) | — | 0.23 | 0.22 | 0.32 | 0.20 | 0.35 |
|  |  | Loss factor of primary anti-resonance peak (minimum value in the range of 20° C. to 60° C.) | — | 0.06 | 0.06 | 0.11 | 0.06 | 0.13 |
|  |  | Anti-resonance frequency of secondary anti-resonance peak (maximum value in the range of 20° C. to 60° C.) | Hz | 580 | 630 | 580 | 720 | 580 |
|  |  | Anti-resonance frequency of secondary anti-resonance peak (minimum value in the range of 20° C. to 60° C.) | Hz | 330 | 400 | 320 | 430 | 320 |
|  | JIS K7391 | Loss factor of primary anti-resonance peak (maximum value in the range of 20° C. to 60° C.) | — | 0.018 | 0.018 | 0.025 | 0.009 | 0.031 |
|  |  | Loss factor of primary anti-resonance peak (minimum value in the range of 20° C. to 60° C.) | — | 0.006 | 0.006 | 0.007 | 0.006 | 0.011 |
|  |  | Anti-resonance frequency of secondary anti-resonance peak (maximum value in the range of 20° C. to 60° C.) | Hz | 690 | 720 | 680 | 740 | 620 |
|  |  | Anti-resonance frequency of secondary anti-resonance peak (minimum value in the range of 20° C. to 60° C.) | Hz | 540 | 540 | 490 | 440 | 470 |
|  | ISO 16940 | Loss factor of primary anti-resonance peak (maximum value in the range of 0° C. to 50° C.) | — | 0.38 | 0.33 | 0.40 | 0.24 | 0.40 |
|  |  | Loss factor of primary anti-resonance peak (minimum value in the range of 0° C. to 50° C.) | — | 0.19 | 0.16 | 0.21 | 0.16 | 0.20 |
|  |  | Anti-resonance frequency of secondary anti-resonance peak (maximum value in the range of 0° C. to 30° C.) | Hz | 780 | 500 | 550 | 490 | 560 |
|  |  | Anti-resonance frequency of secondary anti-resonance peak (minimum value in the range of 0° C. to 30° C.) | Hz | 520 | 350 | 340 | 320 | 300 |
| Evaluation | Evaluation 1 of sound insulation properties |  |  | ○ | ○ | ○ | ○ | ○ |
|  | Evaluation 2 of sound insulation properties |  |  | ○ | ○ | ○ | ○ | ○ |
|  | Evaluation 3 of sound insulation properties |  |  | ○ | ○ | ○ | ○ | ○ |

TABLE 2

|  |  |  |  | Comparative Example 1 | Comparative Example 2 | Comparative Example 3 | Comparative Example 4 | Comparative Example 5 |
|---|---|---|---|---|---|---|---|---|
| Resin composition | Thermoplastic resin | Type | — | Polyethylene foam | EVA foam | Urethane gel | PVB1 | PVB1 |
|  |  | Amount | Parts by weight |  |  |  | 100 | 100 |
|  | Plasticizer | Type | — |  |  |  | 3GO | 3GO |
|  |  | Amount | Parts by weight |  |  |  | 40 | 40 |
|  | Foaming agent | Type | — |  |  |  | CELLMIC CE | CELLMIC CAP |
|  |  | Amount | Parts by weight |  |  |  | 2 | 9 |

TABLE 2-continued

|  |  |  |  | Comparative Example 1 | Comparative Example 2 | Comparative Example 3 | Comparative Example 4 | Comparative Example 5 |
|---|---|---|---|---|---|---|---|---|
| Foaming temperature |  |  | ° C. | — | — | — | 220 | 150 |
| Foam | Open cell ratio |  | % | <5 | <5 | — | <5 | <5 |
|  | Apparent density |  | kg/m³ | 25 | 110 | 1000 | 950 | 950 |
|  | JIS G0602 | Loss factor of primary anti-resonance peak (maximum value in the range of 20° C. to 60° C.) | — | 0.07 | 0.08 | 0.05 | 0.05 | 0.06 |
|  |  | Loss factor of primary anti-resonance peak (minimum value In the range of 20° C. to 60° C.) | — | 0.03 | 0.04 | 0.03 | 0.03 | 0.04 |
|  |  | Anti-resonance frequency of secondary anti-resonance peak (maximum value in the range of 20° C. to 60° C.) | Hz | 570 | 560 | 510 | 560 | 570 |
|  |  | Anti-resonance frequency of secondary anti-resonance peak (minimum value in the range of 20° C. to 60° C.) | Hz | 480 | 520 | 440 | 320 | 320 |
|  | JIS K7391 | Loss factor of primary anti-resonance peak (maximum value in the range of 20° C. to 60° C.) | — | 0.007 | 0.007 | 0.004 | 0.007 | 0.009 |
|  |  | Loss factor of primary anti-resonance peak (minimum value in the range of 20° C. to 60° C.) | — | 0.002 | 0.002 | 0.002 | 0.003 | 0.003 |
|  |  | Anti-resonance frequency of secondary anti-resonance peak (maximum value in the range of 20° C. to 60° C.) | Hz | 560 | 570 | 480 | 690 | 680 |
|  |  | Anti-resonance frequency of secondary anti-resonance peak (minimum value in the range of 20° C. to 60° C.) | Hz | 540 | 560 | 460 | 450 | 450 |
|  | ISO 16940 | Loss factor of primary anti-resonance peak (maximum value in the range of 0° C. to 50° C.) | — | 0.12 | 0.16 | 0.18 | 0.10 | 0.10 |
|  |  | Loss factor of primary anti-resonance peak (minimum value in the range of 0° C. to 50° C.) | — | 0.09 | 0.10 | 0.05 | 0.06 | 0.06 |
|  |  | Anti-resonance frequency of secondary anti-resonance peak (maximum value in the range of 0° C. to 30° C.) | Hz | 580 | 580 | 410 | 1140 | 1140 |
|  |  | Anti-resonance frequency of secondary anti-resonance peak (minimum value in the range of 0° C. to 30° C.) | Hz | 490 | 500 | 400 | 520 | 540 |
| Evaluation | Evaluation 1 of sound insulation properties |  |  | x | x | x | x | x |
|  | Evaluation 2 of sound insulation properties |  |  | x | x | x | x | x |
|  | Evaluation 3 of sound insulation properties |  |  | x | x | x | x | x |

Example 6

A double-sided adhesive tape for fixing an interior member (available from Sekisui Chemical Co., Ltd., #5782) as an adhesive layer was attached to one surface of the resin foam sheet obtained in Example 1 to give a one-sided adhesive tape.

The obtained one-sided adhesive tape exhibited adhesiveness while maintaining the flexibility and sound insulation properties of the resin foam sheet of Example 1.

In the measurements of the sound insulation properties, the surface of the obtained one-sided adhesive tape to which the double-sided adhesive tape for fixing an interior member (available from Sekisui Chemical Co., Ltd., #5782) was attached was used as it was, with no double-sided adhesive tape newly attached thereto. For the measurements, the double-sided adhesive tape (available from Sekisui Chemical Co., Ltd., #5782) was newly attached only to the surface to which the double-sided adhesive tape for fixing an interior member was not attached.

Example 7

(1) Production of Acrylic Polymer

Into a reaction container were introduced 100 parts by weight of n-butyl acrylate and 11 parts by weight of acrylic acid to give a monomer component. The monomer component was dissolved in ethyl acetate, to which 0.1 parts by weight of lauroyl peroxide as a polymerization initiator was added at the reflux point. The solution was refluxed at 70° C. for five hours to give a solution of an acrylic polymer having a weight average molecular weight of 720,000.

(2) Production of Adhesive Composition and Adhesive Tape

To the obtained acrylic polymer solution were added 6.3 parts by weight of a polymerized rosin ester-type tackifier resin (softening point: 140° C.) containing 13% a component having a molecular weight of 600 or less and 0.054 parts by weight of an aluminum chelate, which is a metal chelate cross-linking agent, as a cross-linking agent, relative to 100 parts by weight of the acrylic polymer (i.e., the non-volatile component of the acrylic polymer solution). They were then uniformly mixed to give an adhesive composition.

Subsequently, the obtained adhesive composition was applied to one surface of the resin foam sheet obtained in Example 1. The adhesive composition was then dried at 120° C. for five minutes to form a one-sided adhesive tape in which an adhesive layer having a thickness of 60 μm was laminated on one surface of the resin foam sheet.

The obtained one-sided adhesive tape exhibited adhesiveness while maintaining the flexibility and sound insulation properties of the resin foam sheet of Example 1. The one-sided adhesive tape did not show a decrease in adhesiveness even one month after adherence.

In the measurements of the sound insulation properties, the surface of the obtained one-sided adhesive tape on which the adhesive layer was laminated was used as it was, with no double-sided adhesive tape newly attached thereto. For the measurements, the double-sided adhesive tape (available from Sekisui Chemical Co., Ltd., #5782) was newly attached only to the surface on which the adhesive layer was not laminated.

(Evaluation)

The one-sided adhesive tapes obtained in Examples 6 and 7 were evaluated as follows.

(Plasticizer Resistance Evaluation)

(1) Sample Preparation

Each of the one-sided adhesive tapes obtained in Examples 6 and 7 was cut to a size of 25 mm in width×150 mm in length, and pressure-bonded to SUS304 (BA surface finish) specified in JIS G4305 by reciprocating a 2-kg rubber roller once at 10 mm/sec in conformity with JIS Z0237.

(2) Measurement of Initial Adhesive Force

The one-sided adhesive tape obtained in the sample preparation was left to stand at 23° C. and 50% RH for 20 minutes after the pressure bonding. The 90° peel test was then performed three times in conformity with JIS 20237. The average value was taken as the initial adhesive force (N/25 mm). The peeling speed was 300 ram/min.

(3) Measurement of Aged Adhesive Force

The sample prepared in the sample preparation was left to stand in an atmosphere at 60° C. for 72 hours, then at 23° C. and 50% RH for 30 minutes. The 90° peel test was then performed three times in conformity with JIS 20237. The average value was taken as the aged adhesive force (N/25 mm).

(4) Evaluation of Adhesive Force Retention

The adhesive force retention (%) was calculated by the following formula based on the initial adhesive force and aged adhesive force obtained above.

Adhesive force retention (%)=100×(Aged adhesive force/Initial adhesive force)

The evaluation results show that the adhesive force retention of the one-sided adhesive tape obtained in Example 7 was greatly improved as compared with that of the one-sided adhesive tape obtained in Example 6.

INDUSTRIAL APPLICABILITY

The present invention can provide a resin foam, a resin foam sheet, an adhesive tape, a member for a vehicle, and a member for a building that are capable of exhibiting very high sound insulation properties.

The invention claimed is:

1. A resin foam having a multitude of cells, the resin foam comprising:
    a thermoplastic resin; and
    a plasticizer,
    the resin foam having an open cell ratio of 20% or higher,
    the resin foam having a minimum loss factor of a primary anti-resonance frequency in the range of 20° C. to 60° C. of 0.05 or higher and a secondary anti-resonance frequency in the range of 20° C. to 60° C. of 300 to 800 Hz as measured by mechanical impedance measurement (MIM) in conformity with JIS G0602.

2. A resin foam having a multitude of cells, the resin foam comprising:
    a thermoplastic resin; and
    a plasticizer,
    the resin foam having an open cell ratio of 20% or higher,
    the resin foam having a minimum loss factor of a primary anti-resonance frequency in the range of 20° C. to 60° C. of 0.005 or higher and a secondary anti-resonance frequency in the range of 20° C. to 60° C. of 300 to 800 Hz as measured by mechanical impedance measurement (MIM) in conformity with JIS K7391.

3. A resin foam having a multitude of cells, the resin foam comprising:
    a thermoplastic resin; and
    a plasticizer,
    the resin foam having an open cell ratio of 20% or higher,
    the resin foam having a maximum loss factor of a primary anti-resonance frequency in the range of 0° C. to 50° C. of 0.20 or higher and a secondary anti-resonance frequency in the range of 0° C. to 30° C. of 800 Hz or lower as measured by mechanical impedance measurement (MIM) in conformity with ISO 16940.

4. The resin foam according to claim 3,
    wherein the maximum loss factor of the primary anti-resonance frequency in the range of 0° C. to 50° C. is 0.24 or higher as measured by mechanical impedance measurement (MIM) in conformity with ISO 16940.

5. The resin foam according to claim 1, further comprising an adhesive.

6. A resin foam sheet comprising:
    the resin foam according to claim 1.

7. An adhesive tape comprising:
    the resin foam sheet according to claim 6; and
    an adhesive layer provided on at least one surface of the resin foam sheet.

8. A member for a vehicle, comprising:
    the resin foam according to claim 1.

9. A member for a building, comprising:
    the resin foam according to claim 1.

10. The resin foam according to claim 2, further comprising an adhesive.

11. The resin foam according to claim 3, further comprising an adhesive.

12. A resin foam sheet comprising:
    the resin foam according to claim 2.

13. A resin foam sheet comprising:
    the resin foam according to claim 3.

14. An adhesive tape comprising:
    the resin foam sheet according to claim 12; and
    an adhesive layer provided on at least one surface of the resin foam sheet.

15. An adhesive tape comprising:
the resin foam sheet according to claim 13; and
an adhesive layer provided on at least one surface of the resin foam sheet.

16. A member for a vehicle, comprising:
the resin foam according to claim 2.

17. A member for a vehicle, comprising:
the resin foam according to claim 3.

18. A member for a building, comprising:
the resin foam according to claim 2.

19. A member for a building, comprising:
the resin foam according to claim 3.

20. The resin foam according to claim 1,
wherein an amount of the plasticizer in the resin foam is 20 to 60 parts by weight relative to 100 parts by weight of the thermoplastic resin.

21. The resin foam according to claim 2,
wherein an amount of the plasticizer in the resin foam is 20 to 60 parts by weight relative to 100 parts by weight of the thermoplastic resin.

22. The resin foam according to claim 3,
wherein an amount of the plasticizer in the resin foam is 20 to 60 parts by weight relative to 100 parts by weight of the thermoplastic resin.

23. The resin foam according to claim 1,
wherein the plasticizer includes triethylene glycol di-2-ethylhexanoate.

24. The resin foam according to claim 2,
wherein the plasticizer includes triethylene glycol di-2-ethylhexanoate.

25. The resin foam according to claim 3,
wherein the plasticizer includes triethylene glycol di-2-ethylhexanoate.

* * * * *